United States Patent [19]

Paskert

[11] 3,914,829
[45] Oct. 28, 1975

[54] RELEASABLY ATTACHABLE CLIP
[75] Inventor: Joseph H. Paskert, Lakewood, Ohio
[73] Assignee: Eaton Corporation, Cleveland, Ohio
[22] Filed: June 1, 1973
[21] Appl. No.: 365,943

[52] U.S. Cl. ............. 24/263 R; 24/230 SL; 24/260; 340/280
[51] Int. Cl. ...................... A44b 21/00; G08b 21/00
[58] Field of Search ... 340/280; 24/158, 162, 100.5, 24/263 R, 263 SB, 260, 211 R; 70/59, 60; 292/25 C

[56] References Cited
UNITED STATES PATENTS

| | | | |
|---|---|---|---|
| 2,774,060 | 12/1956 | Thompson | 340/280 UX |
| 3,049,782 | 8/1962 | Hawie | 240/260 |
| 3,137,027 | 6/1964 | Birkle | 24/260 UX |
| 3,214,810 | 11/1965 | Mathison | 24/260 X |
| 3,423,674 | 1/1969 | Goldsmith et al. | 340/280 UX |
| 3,475,810 | 11/1969 | Mates | 24/211 R UX |
| 3,665,448 | 5/1972 | McGlinchey | 340/280 UX |
| 3,718,922 | 2/1973 | Williams et al. | 340/280 |
| 3,755,803 | 8/1973 | Cole | 340/280 |

Primary Examiner—Donald J. Yusko
Assistant Examiner—William M. Wannisky
Attorney, Agent, or Firm—Teagno & Toddy

[57] ABSTRACT

A releasably attachable clip for selective attachment to an article. The clip, which may carry an alarm actuating member or the like, is easily attached to the article and is designed to be released therefrom only upon insertion of a specially configured multi-pronged tool into specially configured mating passageways provided in the body of the clip. The specially configured tool includes a multiplicity of prongs each of which must simultaneously mechanically engage one of the multiplicity of release means within the clip at the ends of the specially configured passages to achieve non-destructive disengagement of the clip from the article.

8 Claims, 11 Drawing Figures

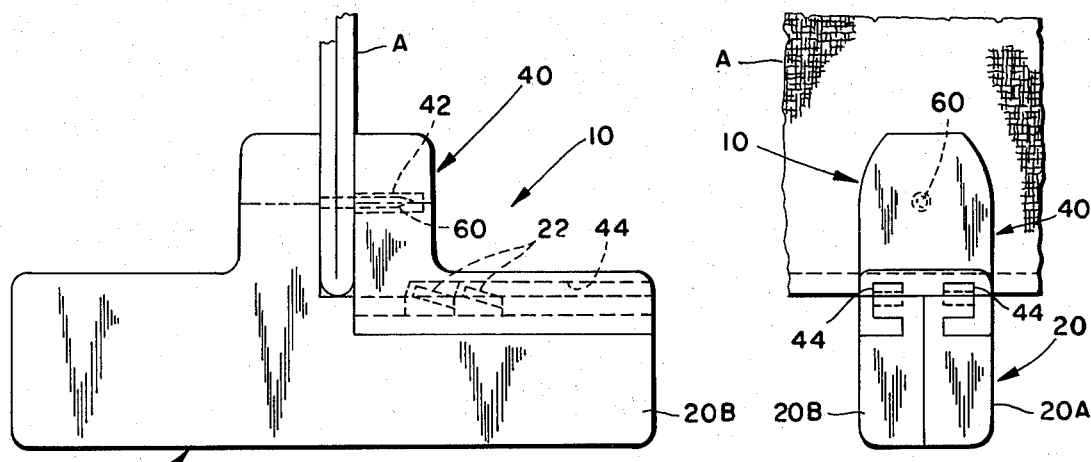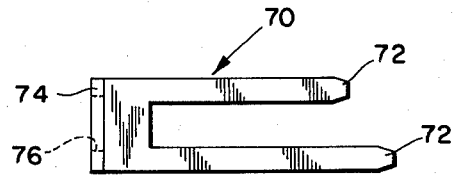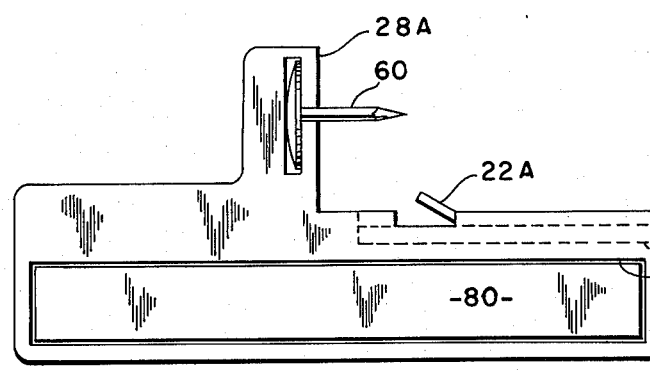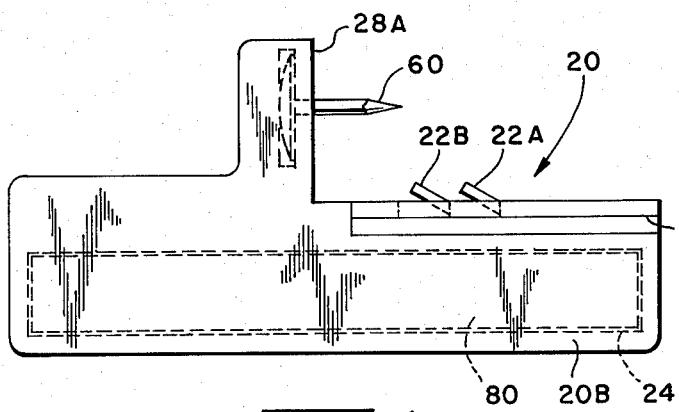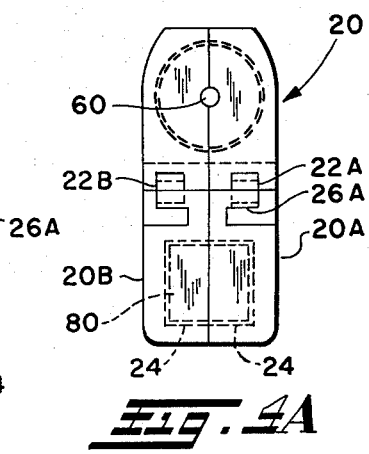

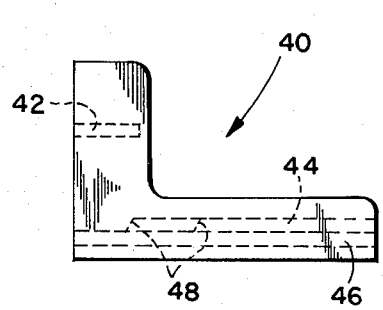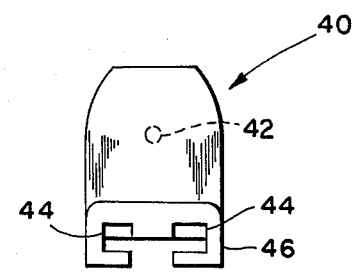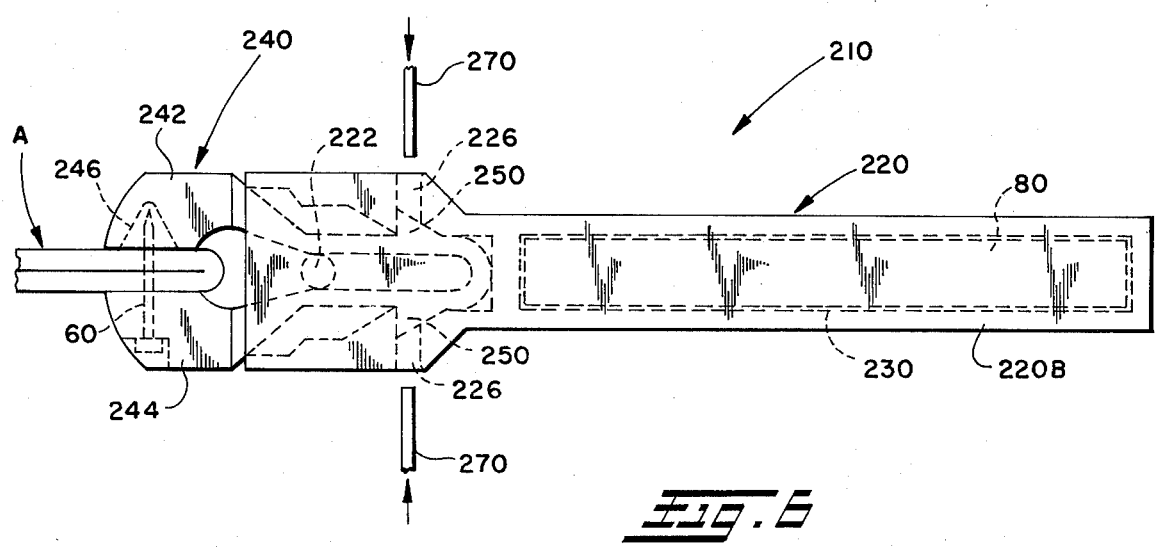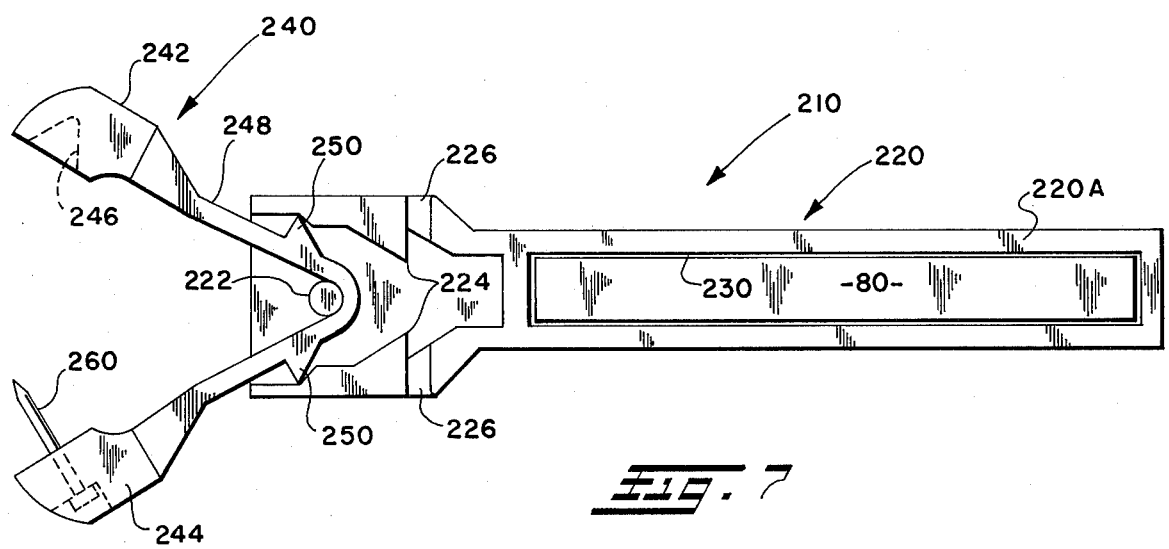

RELEASABLY ATTACHABLE CLIP

BACKGROUND OF THE INVENTION

1. Field of the Invention

This invention relates to releasably attachable clips and more particularly relates to releasably attachable clips which may carry alarm or monitor activating members or the like.

2. Description of the Prior Art

The use of alarms and alarm-activating members attached to articles to signal the unauthorized removal of said articles beyond a monitored point is known in the art. Several of these anti-pilferage or anti-shoplifting systems are described in some detail in U.S. Pat. Nos. 3,665,448; 3,631,442; 3,577,136 and others. In general, the systems comprise an activating device such as a magnet, a miniature circuit, a radio transmitter, or the like which may be releasably attached to an article and a monitoring device which will sound an alarm and/or take a photograph if the activating device is sensed at the monitoring point. The monitoring point is usually located at or beyond the exit of a store, or other designated area. In theory, the activating devices should be easily attached to the articles, easily removed by authorized personnel having the proper equipment and very difficult to remove without the proper equipment, especially for the amateur shoplifter who is responsible for the major portion of shoplifting losses. The activating devices should also be reusable and non-destructive to the articles to which they are attached. The specially provided tool should be difficult to simulate with commonly available articles such as pocketknives, screwdrivers or the like and the tool should be able to assume various configurations to allow for independent systems to be provided while utilizing several basic components of the releasably attaching clip. The tool should also be large enough to attract attention in the event of unauthorized use and should be permanently mountable at an authorized use point, such as a cash register or the like.

Several devices have been utilized in the prior art to attach such activating devices to articles to be protected. Heat-releasable devices of both the melted member type and the bimetallic lever type have been utilized. These heat-releasable devices have not been totally satisfactory as they have not always been reusable, they are relatively expensive to manufacture, they are somewhat difficult and time consuming to remove and they require a heat-generating tool which may injure the article, the activating member and/or the user.

Devices utilizing special keys have also been used. These devices have proven relatively expensive, the keys have proven relatively easy to be misplaced, and the devices have been subject to shoplifters who are somewhat more accustomed to violating key devices. These key-operated devices have also proved relatively expensive for use in independent systems having different keys as the key-release means have been relatively expensive to produce.

Devices utilizing sensors such as described in U.S. Pat. No. 3,665,448, which signal when the actuating device is removed have also been used. These devices are not totally satisfactory as they require complicated monitoring apparatus, the system must be completely or partially de-activated during authorized removal after payment and removal within the confines of the store will activate the alarm while not necessarily signaling an illegal event which may tend to cause confusion, legal liability and/or non-use of the system.

SUMMARY OF THE INVENTION

In accordance with the present invention the drawbacks of the prior art have been overcome to the extent that an inexpensively produced, reusable, releasably attachable clip has been provided. The above is accomplished by utilizing a plurality of release members within the clip which will allow for release of the attached article only upon simultaneous mechanical contact of all release members. Each release member is located at the end of a specially configured passageway within the body of the clip and may easily be mechanically contacted only by use of the specially configured multi-prong tool. To provide for independent systems while utilizing the basic body of the clip and tool, the general configuration of the prongs and matching passageways may be varied, i.e., the number, shape, spacings and/or length of the passageways and mating prongs may be varied from system to system. In a clip having four or five pieces, if all passages are located within one or two of the pieces, all of the remaining pieces may be commonly used for all the independent systems. The provision of variously configured passages will tend to prohibit the production of a master tool or the use of common household tools.

Structurally the clip may have several embodiments to be described below, but generally the clip will include a body for holding the alarm activating device or similar object and a releasable article gripping portion which will release only upon simultaneous mechanical contact of all the release members which are located within the body at the ends of the various passages.

Accordingly, it is an object of the present invention to provide a new and improved releasably attachable clip.

A further object of the present invention is to provide a new and improved releasably attachable clip carrying an alarm activating member or the like which is reusable and is designed for non-destructive release from the attached article only upon insertion of a specially shaped, difficult to simulate, multipronged tool.

A further object is to provide a new and improved reusable, releasably attached clip which will release only upon mechanical contact to all of at least two release members which are located within the body of the clip at the ends of passages therein, the passages being of variable shapes, spacings, location and number to hinder opening other than by insertion of a specialized tool.

These and other objects and advantages of the present invention may be more fully appreciated by a reading of the following description of the preferred embodiment taken in connection with the attached drawings.

BRIEF DESCRIPTION OF THE DRAWINGS

FIG. 1 is a front elevational view of one embodiment of the present invention as releasably attached to an article to be protected.

FIG. 1A is a side elevational view of the embodiment shown in FIG. 1.

FIG. 2 is a top view of the specially configured tool for releasing the clip of FIG. 1.

FIG. 3 is a front view in elevation of several of the components of the clip shown in FIG. 1.

FIG. 3A is a side view of the components shown in FIG. 3.

FIG. 4 is a front view in elevation of the body portion of the present invention.

FIG. 4A is a side view of the body portion of the present invention.

FIG. 5 is a front view of the releasable slide member of the present invention.

FIG. 5A is a side view of the slide member of the present invention.

FIG. 6 is a front view in elevation of an alternate embodiment of the present invention showing a releasably attachable clip releasably attached to an article to be protected and the specially configured release tool used therewith.

FIG. 7 is a front view of several of the components of the clip shown in FIG. 6.

DESCRIPTION OF THE PREFERRED EMBODIMENT

One embodiment of the releasably attachable clip of the present invention may be seen by reference to FIGS. 1 through 5A. In FIGS. 1 and 1A the releasably attachable clip is releasably attached to an article A, in this case a cloth garment. The clip 10 is comprised of a main body portion 20 and a slide portion 40. The garment is attached to the clip 10 by means of a pin member 60 which extends from the main body portion 20 and is received in a bore 42 formed in the slide member 40. The pin member 60 could, of course, extend from slide member 40 and be received in a bore in main body portion 20. As will be explained below in more detail, the slide member 40 is slidably received on body portion 20 and is releasably held in article attaching position on the body portion 20 by means of releasable spring locking members 22 formed on the body 20. The locking members 22 are located at the ends of passages 44 in the slide member when the slide member is in its locked article attaching position as is illustrated in FIGS. 1 and 1A.

FIG. 2 illustrates a specially configured release tool 70 which is designed for release of the clip 10 from the article A. Prongs 72 are of a proper shape, spacing, number and length to allow the prongs to be inserted within the passages 44 and simultaneously mechanically contact and release releasable spring locks 22 allowing the bore 42 in slide member 40 to be slidably disengaged from pin 60 allowing article A to be released from the clip 10. It is noted that the spacing, shape, length, number and orientation of the passages 44 and corresponding prongs 72 may be varied to provide for independent systems utilizing devices similar to clip 10 but requiring a totally different tool. The tool 70 may include a mounting flange 74 having a mounting bore 76 therethrough to provide for permanent mounting of the tool at an authorized release location such as a cash register station or the like. It is pointed out that the various length, shapes and number of passages along with the requirement that all releasable locking members be mechanically depressed simultaneously makes removal by simulated tools and/or common hand tools extremely difficult while not rendering authorized release by those possessing a proper tool unduly difficult or time consuming. The body portion of 20 of this embodiment of the present invention is comprised of two complementary sections 20a and 20b which are substantially identical with the exception of the location of the resilient locking members 22 as will be described in more detail. Throughout this description of the embodiments, a simple numerical character such as 20 will refer to a specific element or portion of the clip 10, such as the body portion thereof, while numerical characters with the letters a and b appended, such as 20a and 20b, will refer to the corresponding right and lefthand elements respectfully, as they appear in the drawings, of the body portions 20a and 20b. Thus, numerical character 20 refers to the assembled body portion which is formed by assembly of the two complementary elements 20a and 20b.

Body portion section 20a as shown in FIGS. 3 and 3A has an alarm-activating member holding cavity 24 in which the alarm-activating device 80 is received. In the present example, the device 80 is a magnet but could be a circuit, a radio transmitter or the like depending upon the nature of the detection system with which the present removably attachable clip is used. The body portion 20 in assembled condition preferably encapsulatingly receives the device 80 to prevent tampering therewith. The body portion 20A also includes a slide glide-way structure 26A for slidably receiving the slide portion 40, a releasable spring lock portion 22a which may be integral with the body portion section 20a and an attachment pin-holding section 28A for holding attachment pin member 60 in proper position to engage and pierce article A and to be received in the bore 42 of slide member 40 when said slide member 40 is in its locked position upon the body portion 20. As has been indicated above, the releasable spring lock member 22A may be variably axially displaced along the slide glide structure 26A and is preferably at a different axial location from that of spring lock 22b found in complementary section 20b.

The body 20 as assembled is shown in FIGS. 4 and 4a. The body is preferably a molded structure of a durable material such as glass-filled polystyrene or the like which will resist damage by perspective shoplifters, vandals and the like. The complementary sections 20a and 20b may be assembled with the activating device 80 and pin 60 enclosed by means of ultrasonic welding, adhesives or other types of tamper-resistant permanent attachment. In FIG. 4, the relative position of the releasable spring-locking members 22 in sections 20a and 20b may be fully appreciated while reference to FIG. 4a clearly illustrates the assembled slide glide-way structure 26.

Slide member 40 is clearly illustrated in front and side elevational views by reference to FIGS. 5 and 5A respectively. The slide member 40 includes an elongated glide member 46 slidably engageable with the slide glide-way 26 in the main body portion 20 to slidably mount the slide member 40 to the body portion 20. Immediately adjacent the glide member 46 are the spring-lock catches 48 designed to engage the resilient springlock 22 and axially lock the slide member on the body. The catches 48 are designed to correspond with the axial spacing of the releasable spring-lock 22 and are axially located to lock the slide member 40 in a position whereat at least the distal portion of the pin 60 is encircled within the bore 42 as is illustrated in FIGS. 1 and 1a. The catches 48 additionally define the inner end of passages 44.

In operation, the slide member 40 is placed on the glide ways 26 in such a position that pin 60 is spaced from the inlet to bore 42. The article A is completely pierced by the pin 60 and the slide member 40 is slidably moved towards the pin holding section 28 to encircle a portion of the pin 60 in bore 42 and depress the releasable locking members 22 which will spring back to engage catches 48 releasably attaching the clip 10 to article A. The clip may be removed by insertion of prongs 72 of tool 70 into the passages 44 of the slide member until they simultaneously mechanically engage and depress the releasable locking members 22 from catches 48 allowing the slide member 40 to be moved axially away from the pin 60 and thus release the article A. An alternate embodiment of the present invention may be seen by reference to FIGS. 6 and 7. In FIG. 6, the releasably attachable clip 210 of the alternate embodiment is shown as releasably attached to an article A, in this case a non-destructably pierceable item such as a cloth garment. Although a pin structure is illustrated for attachment of the clip to a pierceable item it is understood that other types of attachment devices such as frictional contact come within the scope of this invention.

The clip 210 comprises a body portion 220 formed of two complementary sections 220a and 220b and an openable and closeable normally V-shaped attachment portion 240. The attachment portion 240 includes two jaw-like sections 242 and 244, one of which mounts a projecting pin member 260 and the other of which includes a cavity 246 for receiving the exposed end of the pin member. The jaw-like sections 242 and 244, are joined by a loop-like hinge 248 which is retained in the body 220 by means of a post 222. The loop-like hinge 248 is of a resilient material and is normally in a spread-apart condition as is shown in FIG. 7. The hinge 248 has a multiplicity of releasable locking members 250 which, as is shown by phantom lines in FIG. 6, will engage stops 224 in body 220 to releasably lock the jaws in the attaching position as is shown in FIG. 6. The body, which is comprised of two complementary sections 220a and 220b, defines a multiplicity of passageways 226 which lead from the outside of the body to the releasable spring locking members 250 when the attachment portion is in the releasably attached position. Of course, the number, shape, orientation and length of the passageways and the corresponding releasable locking members may be varied to provide a series of independent systems utilizing devices similar to releasably attached clip 210.

FIG. 7 shows the clip with one of the two complementary body sections 220a and 220b removed and the clip in released position.

In FIG. 6 a cut-away portion of the disassembly tool 270 is shown as it would be inserted into passages 226 to simultaneously, mechanically contact releasable locking members 250 to release said locking members from the stops 224 allowing the releasably attached clip 210 to release article A. As was the case with the embodiment of FIG. 1, the body of 220 has an alarm activating device receiving cavity 230 therein which may receive any type of device 280. The device 280 shown in FIG. 7 is a radio transmitter designed to activate an alarm including a radio receiver.

Although this invention has been described in its preferred form with a certain degree of particularity, it is understood that the present disclosure of the preferred forms has been made only by way of example and that numerous changes in the details of construction and combination and arrangement of the parts may be resorted to without departing from the spirit and the scope of the invention and hereinafter claimed.

I now claim:

1. A clip adapted for releasable attachment to an article to be monitored by a monitor, said clip comprising;
    a body adapted for encapsulating receipt of a monitor activating device, said body comprising two complementary molded sections; and
    a molded, one-piece slide member slidably engageable with said body, said slide member having a first position relative to said body for release of said article and a second position relative to said body for releasable attachment to said article, said body and slide member defining a plurality of releasable spring-locking members and matching spring-locking member catches to releasably lock said slide member in said second position, said releasable spring members formed as integral parts of said body and said catches defined by the ends of said passageways formed in said slide member, said locking members and locking member catches being interior of said clip when said slide member is in the second position and accessible from the exterior of said clip only via passageways, one for each mating locking member and catch, opening to the exterior of said clip, said slide member releasable from said second position only upon simultaneous, axial mechanical contact of all of said spring-locking members, said passageways being substantially parallel to the slide axis of said slide member, at least two of said catches being located at substantially different axial distances from the exterior opening of said passageways to make application of the required simultaneous coaxial mechanical contact difficult without the use of a specially configured, complementary multi-pronged tool, said body and said slide member define a pin and a pin receiving cavity, said pin received in said cavity when said slide member is in said second position.

2. A clip adapted for releasable attachment to an article, said clip comprising:
    a body; and
    a movable member associated with said body, said member having a first position relative to said body for release of said article and a second position relative to said body for releasable attachment to said article, said body and said movable member having a plurality of interacting releasable locking means for releasably retaining said movable member in said second position, said movable member releasable from said second position only upon simultaneous mechanical contact of all said releasable locking means, said locking means being internal of said clip when said movable member is in said second position and being accessible from the exterior of said clip for mechanical contact only via passageways formed in the movable member, said passageways being substantially parallel and of substantially greater axial dimension than transverse dimension, at least two of said locking means being located at different axial distances from the exterior opening of said passageways to render simultaneous application of mechanical contact on all of said locking means difficult without the use of a specially configured, complementary multi-pronged tool.

3. The clip of claim 2 wherein said mechanical contact is a contact substantially coaxial with the axis of the passageway via which the locking member is accessible from the exterior of the clip.

4. The clip of claim 2 wherein said article is a substantially non-destructable pierceable article and said clip includes a pin and a pin-receiving cavity, said pin adapted to pierce said article and to be received in said cavity when said movable member is in said second position.

5. The clip of claim 3 when said locking means comprise a spring-locking member and spring-locking member catch, said substantially coaxial contact acting on said spring-locking members to disengage said spring-locking members from said catches.

6. A clip adapted for releasable attachment to an article to be monitored by a monitor, said clip comprising;
   a body for encapsulating receipt of a monitor activating device, and
   a slide member slidable engageable with said body, said slide member having a first position relative to said body for release of said article and a second position relative to said body for releasable attachment to said article, said body and slide member defining a plurality of releasable spring-locking members and matching spring-locking member catches to releasably lock said slide member in said second position, said locking members and locking member catches being interior of said clip when said slide member is in the second position and accessible from the exterior of said clip only via passageways, one for each mating locking member and catch, opening to the exterior of said clip, said passageways being of substantially greater axial than transverse dimension, said slide member releasable from said second position only upon simultaneous, axial mechanical contact of all of said spring-locking members, and said body and said slide member defining a pin and a pin receiving cavity, said pin received in said cavity when said slide member is in said second position.

7. The device of claim 6 wherein said body comprises two complementary molded sections joined by ultrasonic welding and said slide member is a one-piece molded part.

8. The device of claim 6 wherein said body comprises two joined complementary molded sections and said slide member is a molded one-piece structure, said releasable spring members formed as integral parts of said body and said catches defined by the ends of said passageways formed in said slide member.

* * * * *

UNITED STATES PATENT AND TRADEMARK OFFICE
CERTIFICATE OF CORRECTION

PATENT NO. : 3,914,829
DATED : October 28, 1975
INVENTOR(S) : Joseph H. Paskert

It is certified that error appears in the above-identified patent and that said Letters Patent are hereby corrected as shown below:

Col. 7, line 18,
Claim 6:    After "body" insert "adapted".

*Signed and Sealed this*

*second* Day of *March 1976*

[SEAL]

Attest:

RUTH C. MASON
*Attesting Officer*

C. MARSHALL DANN
*Commissioner of Patents and Trademarks*